United States Patent
Menzl et al.

(10) Patent No.: US 12,243,995 B2
(45) Date of Patent: Mar. 4, 2025

(54) SYSTEM

(71) Applicants: Northvolt AB, Stockholm (SE); Northvolt Systems AB, Stockholm (SE)

(72) Inventors: Kilian Menzl, Bromma (SE); Kenya Shatani, Stockholm (SE); Mark Andrew Ellis, Enebyberg (SE); Michele Tranquillin, Älvsjö (SE)

(73) Assignee: Northvolt AB, Stockholm (SE)

( * ) Notice: Subject to any disclaimer, the term of this patent is extended or adjusted under 35 U.S.C. 154(b) by 0 days.

(21) Appl. No.: 18/728,750

(22) PCT Filed: Mar. 1, 2023

(86) PCT No.: PCT/EP2023/055091
§ 371 (c)(1),
(2) Date: Jul. 12, 2024

(87) PCT Pub. No.: WO2023/166016
PCT Pub. Date: Sep. 7, 2023

(65) Prior Publication Data
US 2025/0007034 A1    Jan. 2, 2025

(30) Foreign Application Priority Data
Mar. 2, 2022  (EP) .................................... 22159701

(51) Int. Cl.
*H01M 10/6554* (2014.01)
*H01M 10/613* (2014.01)
*H01M 10/647* (2014.01)
*H01M 10/6556* (2014.01)
*H01M 50/209* (2021.01)

(52) U.S. Cl.
CPC ..... *H01M 10/6554* (2015.04); *H01M 10/613* (2015.04); *H01M 10/647* (2015.04); *H01M 10/6556* (2015.04); *H01M 50/209* (2021.01)

(58) Field of Classification Search
CPC ........... H01M 10/6554; H01M 10/613; H01M 10/647; H01M 10/6556; H01M 50/209
See application file for complete search history.

(56) References Cited

U.S. PATENT DOCUMENTS

2013/0143093 A1* 6/2013 Teng ................... H01M 10/651
429/120
2017/0324125 A1  11/2017 Schoenherr
2020/0358127 A1* 11/2020 Terauchi ............. H01M 10/613
2021/0273278 A1   9/2021 Yoshida et al.
2022/0013827 A1   1/2022 Egashira et al.

FOREIGN PATENT DOCUMENTS

| | | |
|---|---|---|
| CN | 113594604 A | 11/2021 |
| CN | 109075283 B | 1/2022 |
| DE | 102008059961 A1 | 6/2010 |

OTHER PUBLICATIONS

Extended European Search Report for European Application No. 22159701.6, dated Sep. 16, 2022, 7 pages.
Acknowledgement Receipt, Response, and Amended claims submitted Feb. 14, 2023, for European Application No. 22159701.6, filed in response to the Extended European Search report, dated Sep. 16, 2022, European Patent Office.
Communication Pursuant to Article 94(3) EPC for European Patent Application No. 22159701.6, dated May 12, 2023, (4 pages), European Patent Office, Rijswijk, Netherlands.
Acknowledgement Receipt, Response, and Amended claims submitted Jul. 4, 2023, for European Application No. 22159701.6, filed in response to the Communication Pursuant to Article 94(3) EPC, dated May 12, 2023, European Patent Office.
Communication under Rule 71(3) EPC, for European Patent Application No. 22159701.6, dated Nov. 20, 2023, (31 pages), EuEuropean Patent Office, Rijswijk, Netherlands.
Decision to Grant a European Patent Pursuant to Article 97 (1) EPC, for European Patent Application No. 22159701.6, dated Apr. 25, 2024, (3 pages), European Patent Office, Munich, Germany.
International Search Report and Written Opinion for Patent Cooperation Treaty Application No. PCT/EP2023/055091, dated Apr. 12, 2023, 10 pages.

* cited by examiner

Primary Examiner — Muhammad S Siddiquee
(74) Attorney, Agent, or Firm — Alston & Bird LLP

(57) ABSTRACT

The present invention relates a system (30) comprising a plurality of battery modules (10) and a cold plate (30) for cooling the battery modules. Each battery module comprises a plurality of stacked battery cells (11) and two side plates (12), each side plate having a protruding lower edge (14) supporting a bottom surface (15). The cold plate comprises a base plate (31) provided with cooling channels, wherein the base plate (31) is thermally connected to the bottom surface (15) of the battery cells (11) in each battery module (10); an inlet port (24) for feeding cooling media via the cooling channels to an outlet port (26), and at least one cut-out (32) configured to house one of the protruding lower edges (14) of the side plates (12).

23 Claims, 5 Drawing Sheets

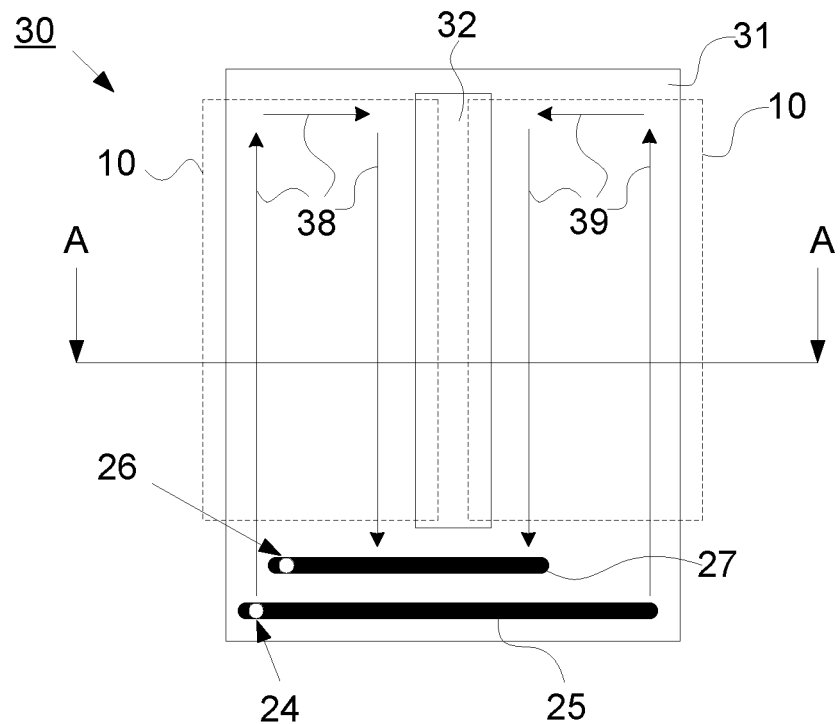
Fig. 3a
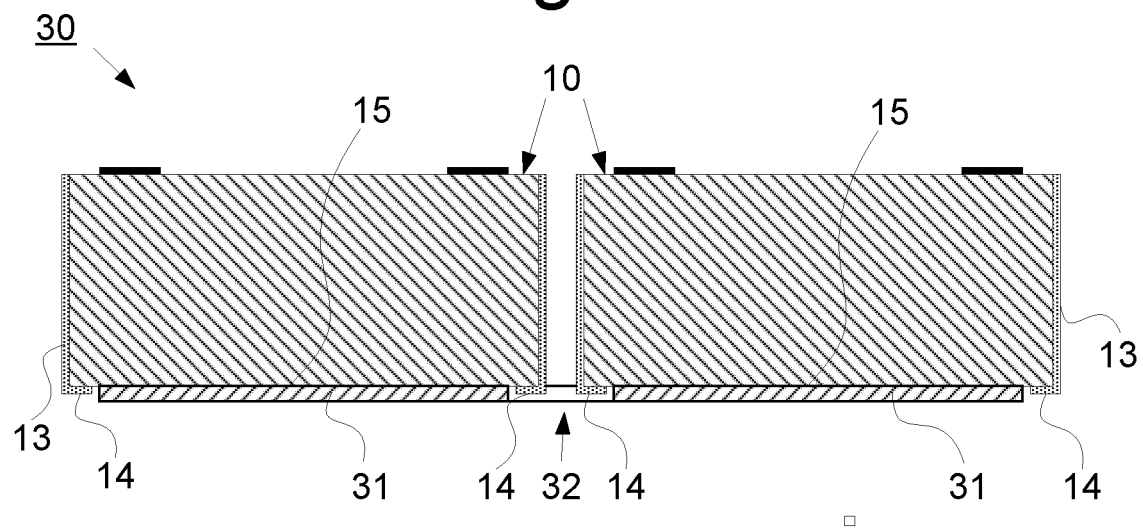
Fig. 3b (section A-A)

SYSTEM

CROSS REFERENCE TO RELATED APPLICATIONS

This application is a National Stage Application, filed under 35 U.S.C. § 371, of International Application No. PCT/EP2023/055091, filed Mar. 1, 2023, which international application claims priority to and the benefit of European Application No. 22159701.6, filed Mar. 2, 2022; the contents of both of which are hereby incorporated by reference in their entirety.

TECHNICAL FIELD

The present disclosure relates to the field of battery modules, and more particular to battery modules with a cold plate configured to be used in energy storage systems.

BACKGROUND

Battery modules for energy storage solutions may comprise a plurality of prismatic battery cells which are stacked within a casing of the battery module. Battery cells generate heat when charged/discharged which needs to be controlled in order for the battery cells to operate within predetermined operating conditions for optimal functionality. Cooling can be provided by placing a cooling arrangement, such as a cold plate, outside the casing of the battery module, which is not an optimal solution due to limited thermal conductivity of the material in the casing of the battery module. In order to improve the cooling of the battery cells, the cooling arrangements may be integrated within the battery casing, i.e. between a surface of the battery cells and the module casing, which may lead to a more complex product manufacturing process. Furthermore, the volume of the battery module with the cooling arrangement, irrespectively if the cooling arrangement is arranged outside the battery module or integrating within the battery module, is increased.

There is a need in the art for an improved battery module and cooling arrangement which may overcome one or more of these drawbacks.

SUMMARY

An object of the present disclosure is to provide an improved design of a system comprising a plurality of battery modules and a cold plate for cooling the battery modules which seeks to mitigate or eliminate one or more of the above-identified deficiencies in the art singly or in any combination.

This object is obtained by a system comprising a plurality of battery modules and a cold plate for cooling the plurality of battery modules. Each battery module comprises a plurality of battery cells and two side plates, and each side plate has a protruding lower edge wherein the battery cells are stacked with a bottom surface supported by the protruding lower edge of the two side plates. The cold plate comprises: a base plate provided with cooling channels, wherein the base plate is thermally connected to the bottom surface of the battery cells in each battery module; an inlet port for feeding cooling media via the cooling channels to an outlet port, and at least one cut-out configured to house the protruding lower edge of the side plates.

In addition, this object is also achieved by a cold plate for cooling a plurality of battery modules in a system, wherein each battery module comprises a plurality of battery cells and two side plates, each side plate having a protruding lower edge, wherein the battery cells are stacked with a bottom surface supported by the protruding lower edge of the two side plates, wherein the cold plate comprises: a base plate provided with cooling channels, wherein the base plate is configured to be thermally connected to the bottom surface of the battery cells in each battery module; an inlet port for feeding cooling media via the cooling channels to an outlet port, and at least one cut-out configured to house one of the protruding lower edges of the side plates.

Furthermore, this object is achieved by an energy storage system comprising at least one system as disclosed above.

An advantage with the present invention is that a more efficient cooling of a battery module is achieved since the surface of the cooling channels of the cold plate may be positioned close to the battery cells within the battery module without having to integrate the cooling arrangement in the battery modules. At the same time, the shape of the side plates protects and supports the cells. The resulting improved mechanical stability facilitates handling and assembly of the module. This design makes it possible to use one large cold plate to cool several modules, which further simplifies manufacturing, reduces costs and improves reliability due to a reduced number of parts.

Another advantage is that more volume-efficient design of the system is achieved compared to prior art solutions, since a part of each battery module is housed in a cut-out of the cold plate.

Further aspects and advantages may be obtained by a skilled person from the detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3*a* is an illustrative top view of a second example embodiment of a cold plate;

FIG. 3*b* is a cross-sectional view of battery modules of FIG. 1 arranged on the cold plate of FIG. 3*a;*

DETAILED DESCRIPTION

Figure 1:
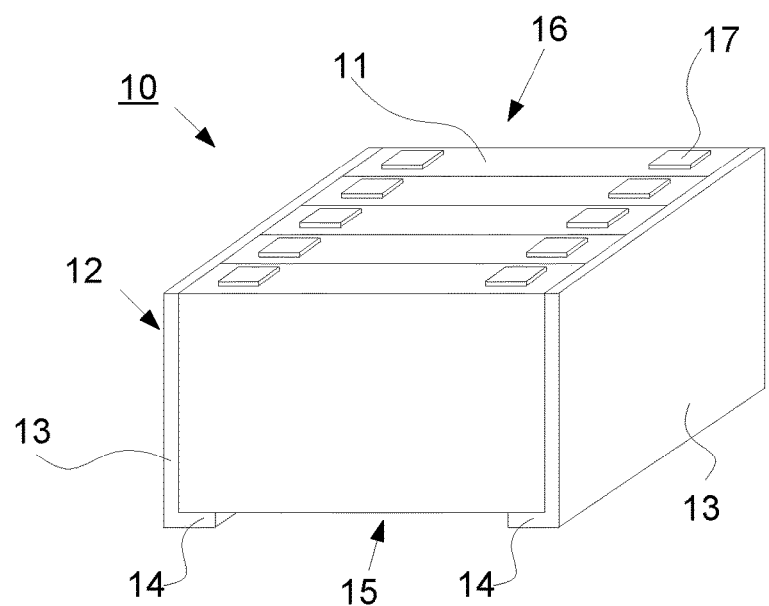
FIG. 1 is an perspective view of a first example of a part of a battery module.

Aspects of the present disclosure will be described more fully hereinafter with reference to the accompanying drawings. The apparatus disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Some of the example embodiments presented herein are directed towards a system comprising a plurality of battery modules with a cold plate for cooling the plurality of battery modules. Each battery module comprises battery cells, which may be prismatic cells (in particular lithium-ion secondary battery cells) and the example embodiments of the system may be used in an energy storage system, ESS, or in an automotive application.

FIG. 1 is a perspective view of a first example of a battery module 10 which in this example comprises five battery cells 11 with a bottom surface 15 and a top side 16. The module also comprises two side plates 12. Each side plate 12 is in this example L-shaped and together they are configured to position the battery cells 11 adjacent to each other and maintain the form of the battery module 10, e.g. using an adhesive. Each side plate 12 comprises a side portion 13 and a protruding lower edge 14, wherein the battery cells are stacked with the bottom surface 15 supported by the protruding lower edge 14 and the side portion 13 extends in a direction perpendicular to the bottom surface 15 of the battery cells. The top side 16 may also comprise terminals 17 and exhaust valves (not shown). For completeness, it is noted that a battery module may comprise additional components, which are not shown in FIG. 1 in order to not obscure the inventive concept. For example, cell spacers may be placed between each pair of battery cells to provide electrical insulation and improve the compression uniformity along the length of the battery stack. Further, end plates may be provided at each end of the battery stack, combining with the side plates to form a complete enclosure for the cells. Yet further, the cell terminals are typically attached to bus bars, e.g. via welding, in order to provide an electrical connection with the cells to enable charging and discharging. A cell sensing assembly may be provided on top of the cell stack with temperature and/or voltage sensors which are attached to the cells or bus bars e.g. using a wire harness. A top lid may additionally be provided over the cell sensing assembly to protect and insulate the enclosure.

This design reduces the amount of material needed to maintain the battery cells in a stacked configuration within the battery module. Furthermore, the weight of the battery module is also reduced as well as exposing a large portion of the bottom surface of the battery cells, which may be used to cool the battery cells in an efficient way.

Figure 2:
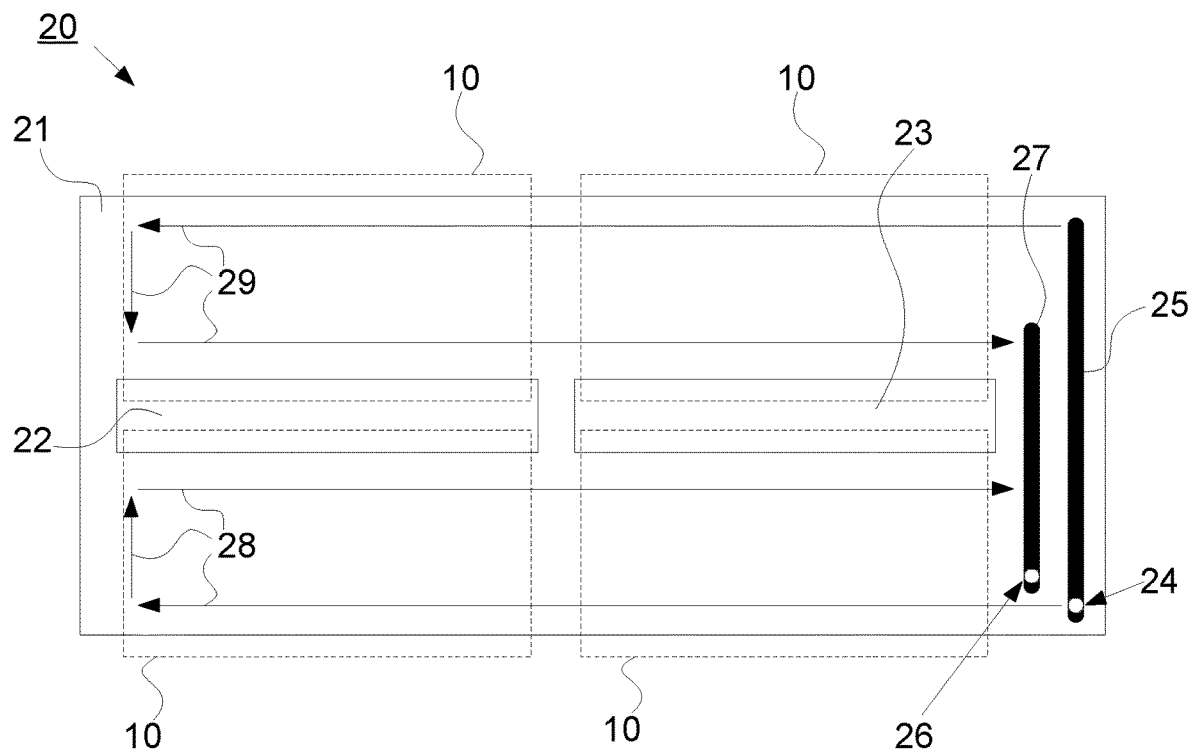
FIG. 2 is an illustrative top view of a first example embodiment of a cold plate.

FIG. 2 is an illustrative top view of a first example embodiment of a cold plate 20 for four battery modules 10 (indicated by dotted lines in FIG. 2), where each battery cell of the battery module has an exposed bottom surface 15 intended to be cooled by the cold plate. The cold plate 20 comprises a base plate 21 provided with cooling channels which are schematically illustrated with arrows 28 and 29 in two cooling loops. Furthermore, the cold plate 20 comprises an inlet port 24 configured to provide cooling media to a first cooling loop 28 and to a second cooling loop 29 via an inlet manifold 25. In addition, the cold plate 20 comprises an outlet port 26 configured to receive cooling media from the first cooling loop 28 and the second cooling loop 29 via an outlet manifold 27. The cold plate further comprises two cut-outs 22 and 23 configured to house the protruding lower edge 14 of each battery module 10 in order for the bottom surface 15 of the battery cells 11 to be arranged close to the cooling loops 28, 29 of the cold plate 20. The respective cut-out 22 and 23 is in this example illustrated with a closed perimeter.

FIG. 3a is an illustrative top view of a second example embodiment of a cold plate 30 for two battery modules 10 (indicated by dotted lines in FIG. 3), where each battery cell within the battery module has a bottom surface 15 intended to be cooled by the cold plate 30. The cold plate 30 comprises a base plate 31 provided with cooling channels which are schematically illustrates with arrows 38 and 39 in two cooling loops. Furthermore, the cold plate 30 comprises an inlet port 24 configured to provide cooling media to a first cooling loop 38 and to a second cooling loop 39 via an inlet manifold 25. In addition, the cold plate 30 comprises an outlet port 26 configured to receive cooling media from the first cooling loop 38 and the second cooling loop 39 via an outlet manifold 27. The cold plate further comprises one cut-out 32 configured to house the protruding lower edge 14 of each battery module 10 in order for the bottom surface 15 of the battery cells 11 to be arranged close to the cooling loops 38, 39 of the cold plate 30. The cut-out 32 is in this example illustrated with a closed perimeter.

FIG. 3b is a cross-sectional view along A-A of the cold plate of FIG. 3a with a cross-sectional view of two battery modules 10 of FIG. 1. The bottom surfaces 15 of the battery cells 11 of each battery module 10 are positioned adjacent to the cooling loops in the base plate 31 since one of the protruding lower edges 14 of each battery module 10 is positioned in the cut-out 32.

Figure 4:
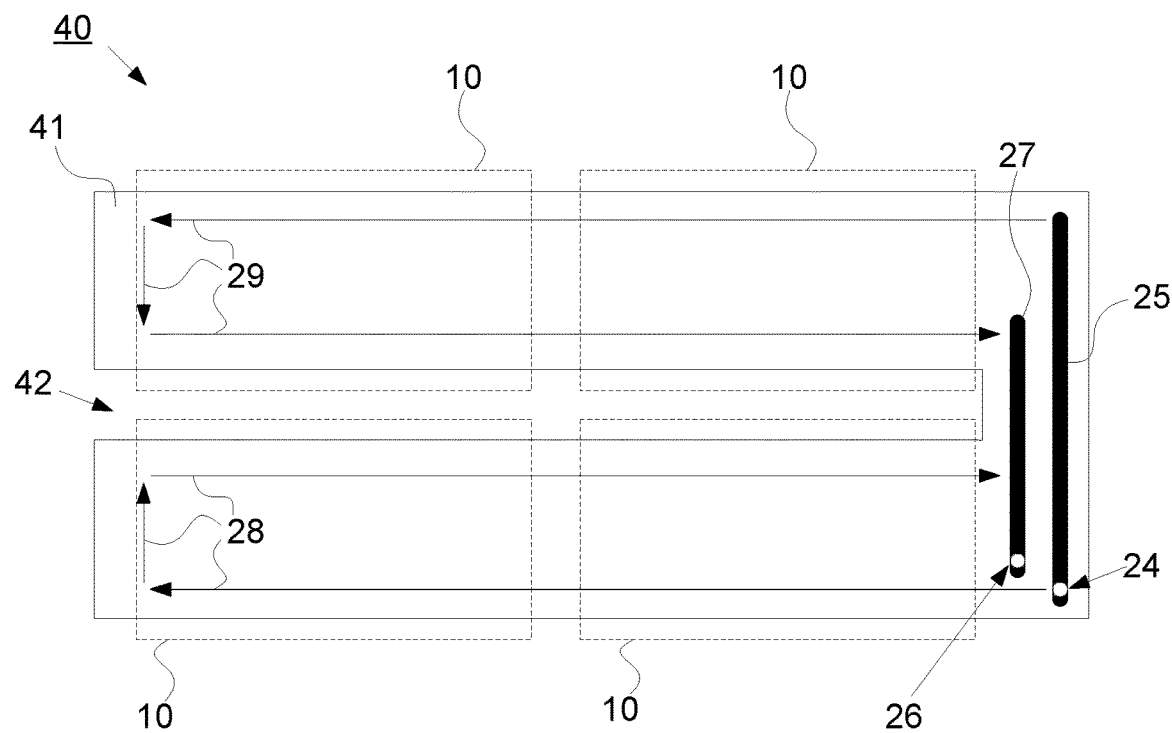
FIG. 4 is an illustrative top view of a third example embodiment of a cold plate.

FIG. 4 is an illustrative top view of a third example embodiment of a cold plate 40 for four battery modules 10 (indicated by dotted lines in FIG. 4), each battery cell of the battery module has an exposed bottom surface intended to be cooled by the cold plate 40. The cold plate 40 comprises a base plate 41 provided with cooling channels which are schematically illustrates with arrows 28 and 29 in two cooling loops. Furthermore, the cold plate 40 comprises an inlet port 24 configured to provide cooling media to a first cooling loop 28 and to a second cooling loop 29 via an inlet manifold 25. In addition, the cold plate 40 comprises an outlet port 26 configured to receive cooling media from the first cooling loop 28 and the second cooling loop 29 via an outlet manifold 27. The cold plate further comprises one cut-out 42 configured to house one of the protruding lower edges 14 of each battery module 10 in order for the bottom surfaces 15 of the battery cells 11 to be arranged close to the cooling loops 28, 29 of the cold plate 40. The cut-out 42 is in this example illustrated with an open perimeter.

Figure 5:
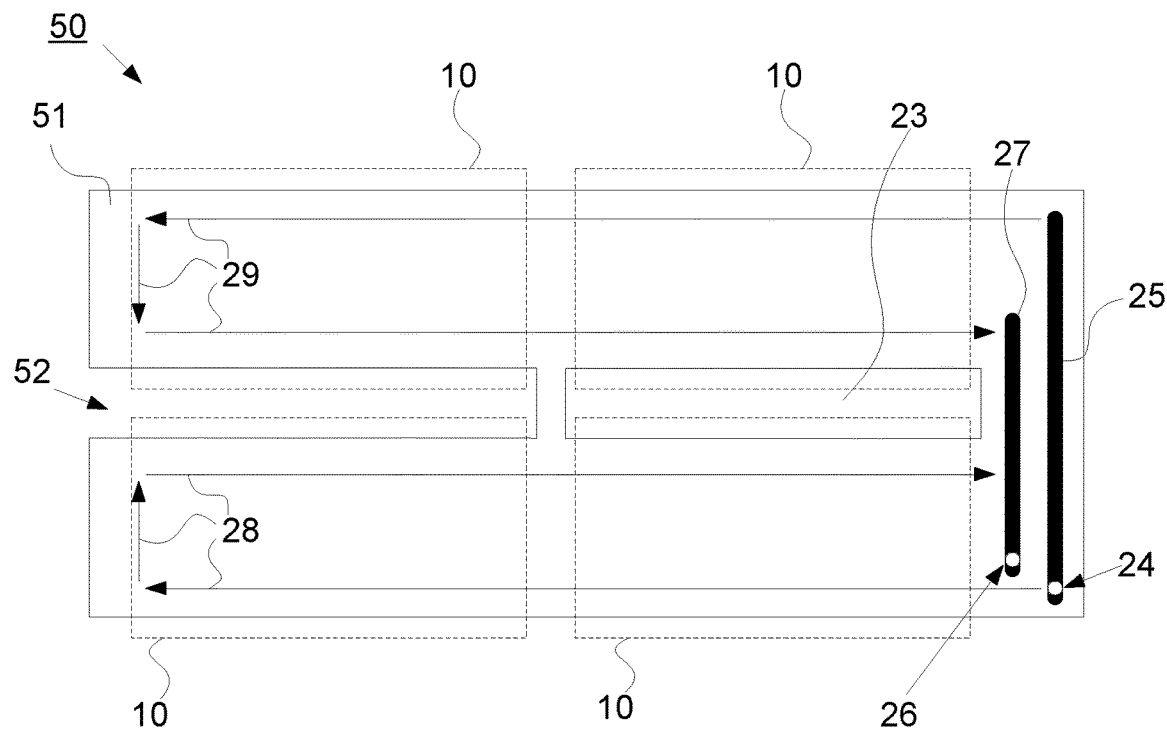
FIG. 5 is an illustrative top view of a fourth example embodiment of a cold plate.

FIG. 5 is an illustrative top view of a fourth example embodiment of a cold plate 50 for four battery modules 10 (indicated by dotted lines in FIG. 4), each battery cell of the battery module has an exposed bottom surface intended to be cooled by the cold plate 50. The cold plate 50 comprises a base plate 51 provided with cooling channels which are schematically illustrates with arrows 28 and 29 in two cooling loops. Furthermore, the cold plate 50 comprises an inlet port 24 configured to provide cooling media to a first cooling loop 28 and to a second cooling loop 29 via an inlet manifold 25. In addition, the cold plate 50 comprises an outlet port 26 configured to receive cooling media from the first cooling loop 28 and the second cooling loop 29 via an outlet manifold 27. The cold plate further comprises two cut-outs 23 and 52 configured to house one of the protruding lower edges 14 of each battery module 10 in order for the bottom surface 15 of the battery cells 11 to be arranged close to the cooling loops 28, 29 of the cold plate 50. A first cut-out 23 is in this example illustrated with a closed perimeter, and a second cut-out 42 is in this example illustrated with an open perimeter.

It should be noted that the cooling channels 28, 29; 38, 39 in the above described example embodiments may be configured to regulate the flow of cooling media in each cooling loop. This may be achieved by letting the cooling channels have equal height (to ensure that the cold plate has a uniform thickness) and varying width to regulate the flow of cooling media through the cooling channels.

An implementation of a cold plate 60 is illustrated in connection with FIG. 6, in which each cooling loop is divided into cooling sections connected via transport sections and each cooling section is configured to be positioned adjacent to the surface of the battery cells 11 in the respective battery module 10.

Figure 6:
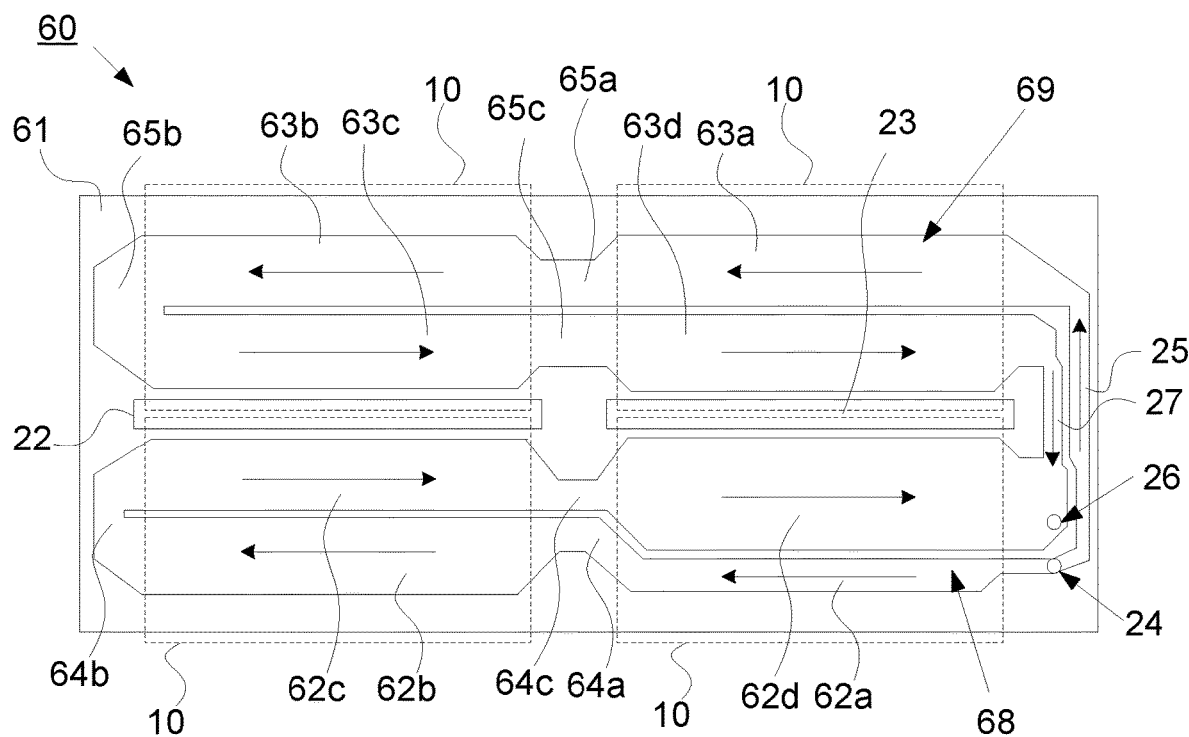
FIG. 6 is a top view of an implementation of the first example embodiment of a cold plate.

FIG. 6 is a top view of a cold plate 60, which is an implementation of the first example embodiment of a cold plate described in connection with FIG. 2 a cold plate 20, for four battery modules 10 (indicated by dotted lines in FIG. 6), each battery cell of the battery module has an exposed bottom surface intended to be cooled by the cold plate 60. The cold plate 60 comprises a base plate 61 provided with cooling channels in two cooling loops 68 and 69. Furthermore, the cold plate 60 comprises an inlet port 24 configured to provide cooling media to a first cooling loop 68 and to a second cooling loop 69 via an inlet manifold 25. In addition, the cold plate 60 comprises an outlet port 26 configured to receive cooling media from the first cooling loop 68 and the second cooling loop 69 via an outlet manifold 27. The cold plate further comprises two cut-outs 22 and 23 configured to house one of the protruding lower edges 14 of each battery module 10 in order for the bottom surface 15 of the battery cells 11 to be arranged close to the cooling loops 68, 69 of the cold plate 60. The respective cut-out 22 and 23 is in this example illustrated with a closed perimeter.

Each cooling loop 68 and 69 comprises several cooling sections 62a-62d and 63a-63d connected via transport sections 64a-64c, 65a-65c, wherein each cooling section 62a-62d and 63a-63d is configured to be positioned adjacent to the battery module 10. The inlet port 24 is in this implementation positioned closer to the first cooling loop 68 compared to the second cooling loop 69, and the flow of cooling media at the cooling section 62a closest to the inlet port 24 is higher than the flow of cooling media in the cooling section 62d closest to the outlet port 26.

The second cooling loop 69 is connected to the inlet port 24 via a first manifold 25 and connected to the outlet port 26 via a second manifold 27, wherein the flow of cooling media in the cooling section 63a closest to the inlet manifold 25 is the same as the flow of cooling media in the cooling section 63d closest to the outlet manifold 27.

Each transport section 64a-64c and 65a-65c is configured to balance the flow of media between the first cooling loop 68 and second cooling loop 69. This may be performed by reducing the width of the cooling channel in the transport sections compared to the adjacent cooling sections. For instance, the first cooling loop 68 closest to the inlet port 24 has a restricted portion in a first part of the cooling loop. The purpose is to increase the pressure in the first part to ensure an equal flow in both cooling loops. Without this restriction, the cooling media flow in the first cooling loop 68 would be higher than the cooling media flow in the second cooling loop 69 since the cooling media will take the path of least resistance.

Furthermore, as illustrated, the transport sections 64a-64c, 65a-65c are implemented as restricted portions in the cooling loops. In the illustrative example in FIG. 6, the first cooling loop has three restricted portions, but other designs are possible.

It is advantageous to implement the restricted portions in the transport sections situated between the battery modules 10 and not directly underneath the battery cells, otherwise the cooling effect could be reduced. This is illustrated in FIG. 6 where transport sections 64a, 64c, 65a and 65c (implemented with restricted portions) are positioned in the middle (between two modules), transport sections 64b and 65b are positioned at the 180 degree turn of each cooling loop and restricted portions are positioned at the end of each cooling loop near the outlet port 26.

For instance, the ratio of the restricted portions in the transport sections 64a-64b, 65a-65c to the wider portions in the cooling sections 62a-62d, 63a-63d should be in the range 30-50%. As an example, if there are several restricted portions a first portion could be 30% and a second one could be 50% of the width.

The flow design with restricted portions (in combination with the cutouts 22, 23) enable the use of one large cold plate 61 for several modules 10 instead of separate cold plates for each module.

Figure 7:
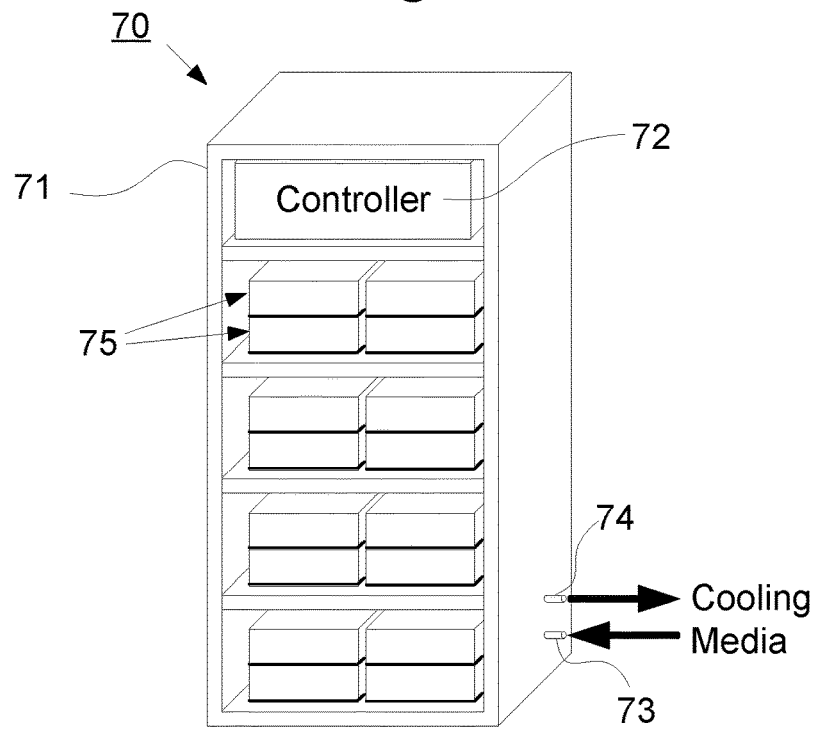
FIG. 7 is a perspective view of an energy storage system, ESS.

FIG. 7 is a perspective view of an energy storage system, ESS, 70 comprising a cabinet 71 with a controller 72, at least one battery system 75 and an inlet 73 and outlet 74 for cooling media. In this example, the ESS 70 comprises sixteen battery systems 75. Each battery system 75 comprises a plurality of battery modules 10 and a cold plate provided with at least one cut-out configured to house at least one of the protruding lower edges of each battery module 10. The battery systems may be stacked and/or arranged on shelves. The inlet/outlet of the cooling media is connected to the inlet port 24 and the outlet port 26 of each cold plate via a cabinet manifold (not shown) to provide adequate cooling properties to the battery cells within the battery modules. The inlet 73/outlet 74 may be positioned on the same cabinet wall (as illustrated) or on different cabinet walls. Furthermore, the inlet 73/outlet 74 may be positioned on any cabinet wall, e.g. the rear wall.

Figure 8A:
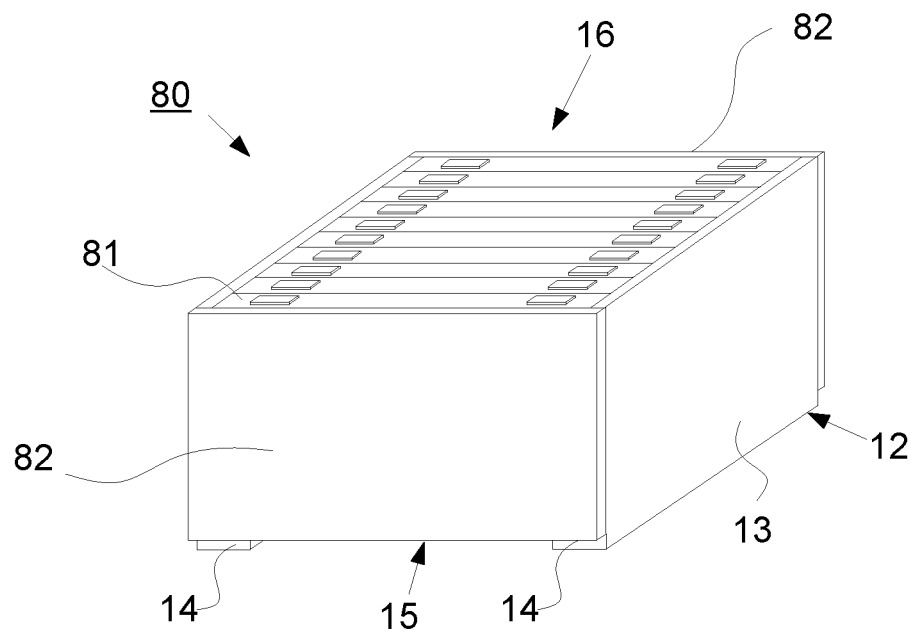
FIG. 8*a* is a perspective view of a second example of a part of a battery module.

FIG. 8a is an perspective view of a second example of parts of a battery module 80 which in this example comprises ten battery cells 81 with a bottom surface 15 and a top side 16. The battery module further comprises two side plates 12 and two end plates (82). Each side plate 12 is in this example L-shaped and together they are configured to position the battery cells 11 adjacent to each other and maintain the form of the battery module 10, e.g. using an adhesive.

Each side plate 12 comprises a side portion 13 and a protruding lower edge 14, wherein the battery cells are stacked with the bottom surface 15 supported by the protruding lower edge 14 and the side portion 13 extends in a direction perpendicular to the bottom surface 15 of the battery cells. Each end plate 82 extends in a direction perpendicular to the bottom surface 15 and the side portion 13 of the side plates 12, wherein each end plate 82 covers opposing sides of the battery module (80). The top side 16 may also comprise terminals and exhaust valves (not shown).

Figure 8B:
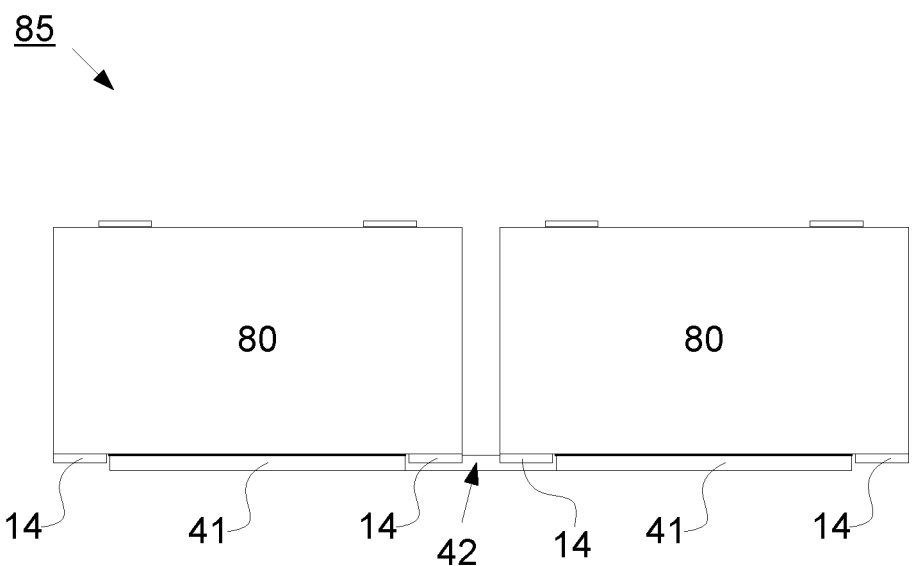
FIG. 8*b* is a side view of battery modules of FIG. 8*a* arranged on the cold plate of FIG. 4.

This design has the same advantages as the first example embodiment of the battery module described in connection with FIG. 1, and also increases the structural stability compared to the first example of the battery module 10 in FIG. 1 without increasing the volume of the complete system when placed on a cold plate as illustrated in FIG. 8b.

FIG. 8b is a side view of a system 85 where two battery modules 80 are placed on the cold plate of FIG. 4. The bottom surface 15 of the battery cells 81 of each battery module 80 is positioned adjacent to the cooling loops in the base plate 41 since one of the protruding lower edges 14 of each battery module 80 is positioned in the cut-out 42.

This disclosure relates to a system comprising: a plurality of battery modules, wherein each battery module comprises a plurality of battery cells and two side plates, each side plate having a protruding lower edge, wherein the battery cells are stacked with a bottom surface supported by the protruding lower edge of the two side plates; and a cold plate for cooling the plurality of battery modules; wherein the cold plate comprises: a base plate provided with cooling channels, wherein the base plate is thermally connected to the bottom surface of the battery cells in each battery module; an inlet port for feeding cooling media via the cooling channels to an outlet port, and at least one cut-out configured to house one of the protruding lower edges of the side plates.

According to some aspects, each of the two side plates further comprises a side portion extending in a direction perpendicular to the bottom surface of the battery cells, wherein each side plate further covers opposing sides of the battery module.

According to some aspects, each battery module further comprises two end plates extending in a direction perpendicular to the bottom surface and the side portion of the side plates, wherein each end plate covers opposing sides of the battery module.

According to some aspects, each side plate has an L-shape. Other shapes, e.g. a bracket shape, with a protruding lower edge may be used that supports the bottom surface of the battery cells in a battery module.

According to some aspects, the at least one cut-out comprises a cut-out with a closed perimeter.

According to some aspects, the at least one cut-out comprises a cut-out with an open perimeter.

According to some aspects, the cooling channels have equal height and varying width to regulate the flow of cooling media through the cooling channels.

According to some aspects, terminal connections are provided on a top surface opposite to the bottom surface.

According to some aspects, the cooling channels comprises a first cooling loop.

According to some aspects, the cooling channels comprises an inlet manifold and an outlet manifold to provide cooling media from the inlet port to the outlet port via the first cooling loop and a second cooling loop, wherein the at least one cut-out is arranged between the first cooling loop and the second cooling loop.

According to some aspects, the cooling channels are configured to regulate the flow of cooling media in each cooling loop.

According to some aspects, the cooling channels have equal height and varying width to regulate the flow of cooling media in each cooling loop.

According to some aspects, each cooling loop comprises several cooling sections connected via transport sections, wherein each cooling section is positioned adjacent to the battery module, wherein the inlet port is positioned closer to the first cooling loop compared to the second cooling loop, and the flow of cooling media at the cooling section closest to the inlet port is higher than the flow of cooling media in the cooling section closest to the outlet port.

According to some aspects, the second cooling loop is connected to the inlet port via the inlet manifold and connected to the outlet port via the outlet manifold, wherein the flow of cooling media in the cooling section closest to the first manifold is the same as the flow of cooling media in the cooling section closest to the second manifold.

According to some aspects, each transport section is configured to balance the flow of media between the first cooling loop and second cooling loop.

This disclosure also relates to a cold plate for cooling a plurality of battery modules in a system as disclosed above, wherein each battery module comprises a plurality of battery cells and two side plates, each side plate having a protruding lower edge, wherein the battery cells are stacked with a bottom surface supported by the protruding lower edge of the two side plates, wherein the cold plate comprises:
 a base plate provided with cooling channels, wherein the base plate is configured to be thermally connected to the bottom surface of the battery cells in each battery module;
 an inlet port for feeding cooling media via the cooling channels to an outlet port, and
 at least one cut-out configured to house one of the protruding lower edges of the side plates.

According to some aspects, the at least one cut-out comprises a cut-out with a closed perimeter.

According to some aspects, the at least one cut-out comprises a cut-out with an open perimeter.

According to some aspects, the cooling channels have equal height and varying width to regulate the flow of cooling media through the cooling channels.

According to some aspects, the cooling channels comprises a first cooling loop.

According to some aspects, the cooling channels comprises an inlet manifold and an outlet manifold to provide cooling media from the inlet port to the outlet port via the first cooling loop and a second cooling loop, wherein the at least one cut-out is arranged between the first cooling loop and the second cooling loop.

According to some aspects, the cooling channels are configured to regulate the flow of cooling media in each cooling loop.

According to some aspects, the cooling channels have equal height and varying width to regulate the flow of cooling media in each cooling loop.

According to some aspects, each cooling loop comprises several cooling sections connected via transport sections, wherein each cooling section is configured to be positioned adjacent to the battery module, wherein the inlet port is positioned closer to the first cooling loop compared to the second cooling loop, and the flow of cooling media at the cooling section closest to the inlet port is higher than the flow of cooling media in the cooling section closest to the outlet port.

According to some aspects, the second cooling loop is connected to the inlet port via the inlet manifold and connected to the outlet port via the outlet manifold, wherein the flow of cooling media in the cooling section closest to the first manifold is the same as the flow of cooling media in the cooling section closest to the second manifold.

According to some aspects, each transport section is configured to balance the flow of media between the first cooling loop and second cooling loop.

This disclosure further relates to an energy storage system comprising at least one system as disclosed above.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of apparatus, modules and systems. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, and that several "means", "units" or "devices" may be represented by the same item of hardware.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A system comprising:
 a plurality of battery modules (10; 80), wherein each battery module comprises a plurality of battery cells (11; 81) and two side plates (12), each side plate having a protruding lower edge (14), wherein the battery cells are stacked with a bottom surface (15) supported by the protruding lower edge (14) of the two side plates (12);
 a cold plate (20; 30; 40) for cooling the plurality of battery modules;
 wherein:
 the cold plate comprises:
  a base plate (21; 31; 41) provided with cooling channels, wherein the base plate (21; 31; 41) is thermally connected to the bottom surface (15) of the battery cells (11; 81) in each battery module (10; 80);
  an inlet port (24) for feeding cooling media via the cooling channels to an outlet port (26); and
  at least one cut-out (22, 23; 32; 42) configured to house one of the protruding lower edges (14) of the side plates (12),
 the cooling channels comprise a first cooling loop (28; 38; 68) and a second cooling loop (29; 39; 69),
 the cooling channels comprise an inlet manifold (25) and an outlet manifold (27) to provide cooling media from the inlet port (24) to the outlet port (26) via the first cooling loop (28; 38; 68) and the second cooling loop (29; 39; 69), and
 the at least one cut-out (22, 23; 32; 42) is arranged between the first cooling loop (28, 38) and the second cooling loop (29; 39).

2. The system according to claim 1, wherein each of the two side plates (12) further comprises a side portion (13) extending in a direction perpendicular to the bottom surface (15) of the battery cells (11; 81), wherein each side plate (12) further covers opposing sides of the battery module (10; 80).

3. The system according to claim 2, wherein each battery module (80) further comprises two end plates (82) extending in a direction perpendicular to the bottom surface (15) and the side portion (13) of the side plates (12), wherein each end plate (82) covers opposing sides of the battery module (80).

4. The system according to claim 1, wherein each side plate (12) has an L-shape.

5. The system according to claim 1, wherein the at least one cut-out comprises a cut-out (22, 23; 32) with a closed perimeter.

6. The system according to claim 1, wherein the at least one cut-out comprises a cut-out (42; 52) with an open perimeter.

7. The system according to claim 1, wherein the cooling channels have equal height and varying width to regulate the flow of cooling media through the cooling channels.

8. The system according to claim 1, wherein terminal connections (17) are provided on a top surface (16) opposite to the bottom surface (15).

9. The system according to claim 1, wherein the cooling channels are configured to regulate the flow of cooling media in each cooling loop (28, 29; 38, 39; 68, 69).

10. The system according to claim 9, wherein the cooling channels have equal height and varying width to regulate the flow of cooling media in each cooling loop.

11. The system according to claim 10, wherein each cooling loop (68, 69) comprises several cooling sections connected via transport sections, wherein each cooling section is positioned adjacent to the battery module (10; 80), wherein the inlet port (24) is positioned closer to the first cooling loop (68) compared to the second cooling loop (69), and the flow of cooling media at the cooling section closest to the inlet port (24) is higher than the flow of cooling media in the cooling section closest to the outlet port (26).

12. The system according to claim 11, wherein the second cooling loop (69) is connected to the inlet port (24) via the inlet manifold (25) and connected to the outlet port (26) via the outlet manifold (27), wherein the flow of cooling media in the cooling section closest to the first manifold (25) is the same as the flow of cooling media in the cooling section closest to the second manifold (27).

13. The system according to claim 11, wherein each transport section is configured to balance the flow of media between the first cooling loop (68) and second cooling loop (69).

14. A cold plate (20; 30; 40) for cooling a plurality of battery modules in the system according to claim 1, wherein each battery module comprises a plurality of battery cells (11; 81) and two side plates (12), each side plate having a protruding lower edge (14), wherein the battery cells are stacked with a bottom surface (15) supported by the protruding lower edge (14) of the two side plates (12), wherein the cold plate comprises:
 a base plate (21; 31; 41) provided with cooling channels, wherein the base plate (21; 31; 41) is configured to be thermally connected to the bottom surface (15) of battery cells (11; 81) in each battery module (10; 80);
 an inlet port (24) for feeding cooling media via the cooling channels to an outlet port (26); and
 at least one cut-out (22, 23; 32; 42) configured to house one of the protruding lower edges (14) of the side plates (12),
 wherein:
 the cooling channels comprise a first cooling loop (28; 38; 68) and a second cooling loop (29; 39; 69),
 the cooling channels comprise an inlet manifold (25) and an outlet manifold (27) to provide cooling media from the inlet port (24) to the outlet port (26) via the first cooling loop (28; 38; 68) and the second cooling loop (29; 39; 69), and the at least one cut-out (22, 23; 32; 42) is arranged between the first cooling loop (28, 38) and the second cooling loop (29; 39).

15. The cold plate according to claim 14, wherein the at least one cut-out comprises a cut-out (22, 23; 32) with a closed perimeter.

16. The cold plate according to claim 14, wherein the at least one cut-out comprises a cut-out (42; 52) with an open perimeter.

17. The cold plate according to claim 14, wherein the cooling channels have equal height and varying width to regulate the flow of cooling media through the cooling channels.

18. The cold plate according to claim 14, wherein the cooling channels are configured to regulate the flow of cooling media in each cooling loop (28, 29; 38, 39; 68, 69).

19. The cold plate according to claim 18, wherein the cooling channels have equal height and varying width to regulate the flow of cooling media in each cooling loop.

20. The cold plate according to claim 19, wherein each cooling loop (68, 69) comprises several cooling sections connected via transport sections, wherein each cooling section is configured to be positioned adjacent to the battery module (10; 80), wherein the inlet port (24) is positioned closer to the first cooling loop (68) compared to the second cooling loop (69), and the flow of cooling media at the cooling section closest to the inlet port (24) is higher than the flow of cooling media in the cooling section closest to the outlet port (26).

21. The cold plate according to claim 20, wherein the second cooling loop (69) is connected to the inlet port (24) via the inlet manifold (25) and connected to the outlet port (26) via the outlet manifold (27), wherein the flow of cooling media in the cooling section closest to the first manifold (25) is the same as the flow of cooling media in the cooling section closest to the second manifold (27).

22. The cold plate assembly according to claim 20, wherein each transport section is configured to balance the flow of media between the first cooling loop (68) and second cooling loop (69).

23. An energy storage system (70) comprising at least one system according to claim 1.

* * * * *

UNITED STATES PATENT AND TRADEMARK OFFICE
CERTIFICATE OF CORRECTION

PATENT NO. : 12,243,995 B2
APPLICATION NO. : 18/728750
DATED : March 4, 2025
INVENTOR(S) : Kilian Menzl et al.

Page 1 of 1

It is certified that error appears in the above-identified patent and that said Letters Patent is hereby corrected as shown below:

In the Claims

In Column 12, Line 17, Claim 22, delete "assembly according" and insert -- according --, therefor.

Signed and Sealed this
Tenth Day of June, 2025

Coke Morgan Stewart
*Acting Director of the United States Patent and Trademark Office*